US011623974B2

United States Patent
Lee et al.

(10) Patent No.: US 11,623,974 B2
(45) Date of Patent: Apr. 11, 2023

(54) CLICK-ACTIVE JANUS PARTICLES AND METHODS FOR PRODUCING AND USING THE SAME

(71) Applicant: THE TRUSTEES OF THE UNIVERSITY OF PENNSYLVANIA, Philadelphia, PA (US)

(72) Inventors: Daeyeon Lee, Wynnewood, PA (US); Kathleen Stebe, Penn Valley, PA (US); Laura Bradley, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 16/305,195

(22) PCT Filed: Jun. 1, 2017

(86) PCT No.: PCT/US2017/035440
§ 371 (c)(1),
(2) Date: Nov. 28, 2018

(87) PCT Pub. No.: WO2017/210424
PCT Pub. Date: Dec. 7, 2017

(65) Prior Publication Data
US 2019/0177458 A1 Jun. 13, 2019

Related U.S. Application Data

(60) Provisional application No. 62/344,038, filed on Jun. 1, 2016.

(51) Int. Cl.
| | | |
|---|---|---|
| *C08F 257/02* | (2006.01) | |
| *C08F 8/34* | (2006.01) | |
| *C08F 212/08* | (2006.01) | |
| *C09K 23/00* | (2022.01) | |

(52) U.S. Cl.
CPC .............. *C08F 257/02* (2013.01); *C08F 8/34* (2013.01); *C08F 212/08* (2013.01); *C09K 23/00* (2022.01); *C08F 2810/50* (2013.01)

(58) Field of Classification Search
CPC ..... C08F 212/08; C08F 220/18; C08F 257/02
See application file for complete search history.

(56) References Cited

U.S. PATENT DOCUMENTS

| | | |
|---|---|---|
| 2008/0234394 A1 | 9/2008 | Hong et al. |
| 2013/0030120 A1 | 1/2013 | Lin et al. |
| 2014/0193504 A1 | 7/2014 | Wooley et al. |
| 2015/0291742 A1 | 10/2015 | Lee et al. |

FOREIGN PATENT DOCUMENTS

WO 2016/026464 A1 2/2016

OTHER PUBLICATIONS

Li et al.,Synthesis of Biofunctional Janus Particles, Macromol. Rapid Commun. 2015, 36, 1200-1204.*
Kolb et al., "Click Chemistry: Diverse Chemical Function from a Few Good Reactions", Angew. Chem. Int. Ed., 2001 , 40, 2004-2021.

* cited by examiner

*Primary Examiner* — Jeffrey C Mullis
(74) *Attorney, Agent, or Firm* — BakerHostetler

(57) ABSTRACT

A method for producing a click-active Janus particle includes combining seed particles with a monomer emulsion to obtain monomer-swollen seed particles; and polymerizing the monomer-swollen seed particles to obtain click-active Janus particles. A method for functionalizing a click-active Janus particle includes combining seed particles with a monomer emulsion to obtain monomer-swollen seed particles; polymerizing the monomer-swollen seed particles to obtain click-active Janus particles; and functionalizing the click-active Janus particles using one or more click chemistry reactions.

25 Claims, 13 Drawing Sheets

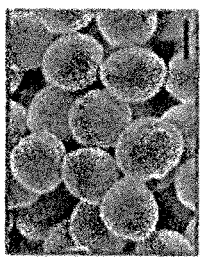
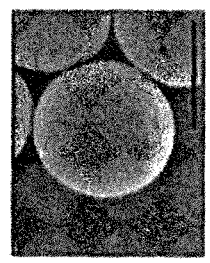
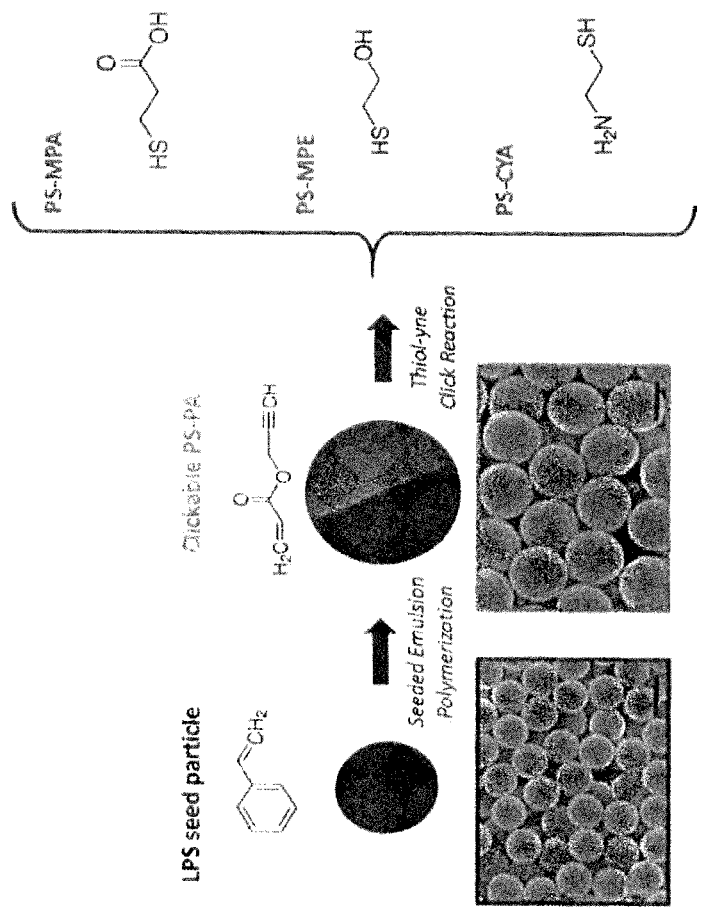
FIG. 3a FIG. 3b FIG. 3c FIG. 3d FIG. 3e

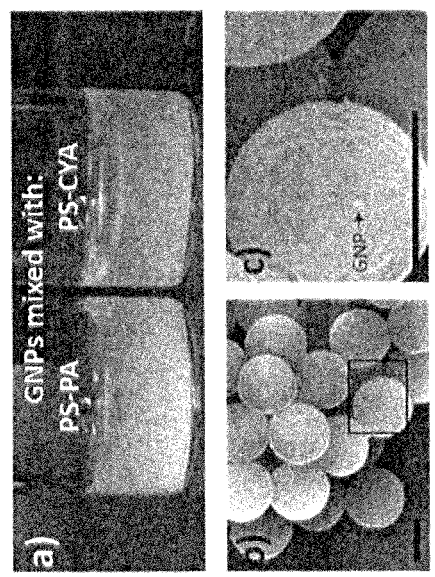
FIGs. 4a-c

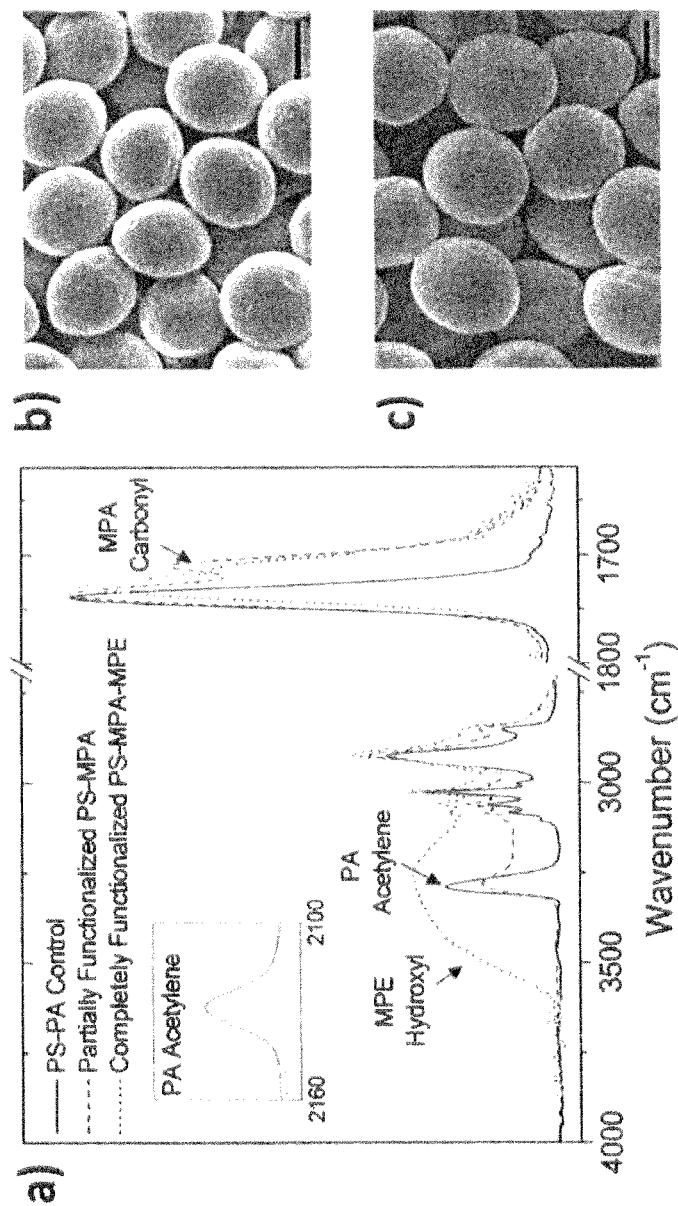
FIGs. 9a-c

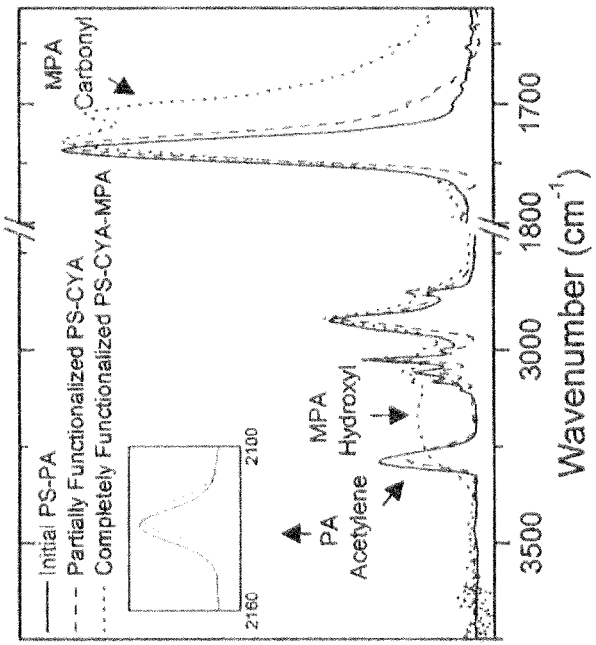
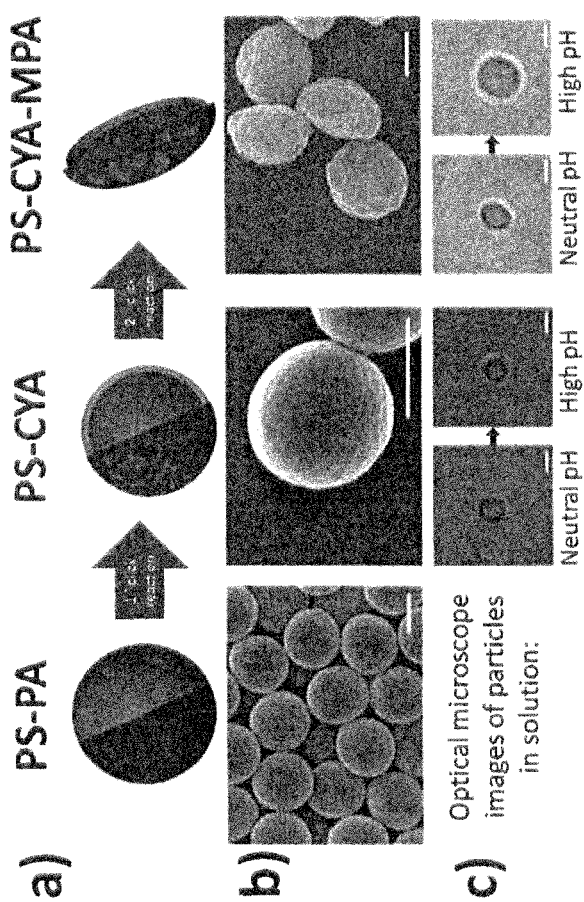
FIGs. 11a-d

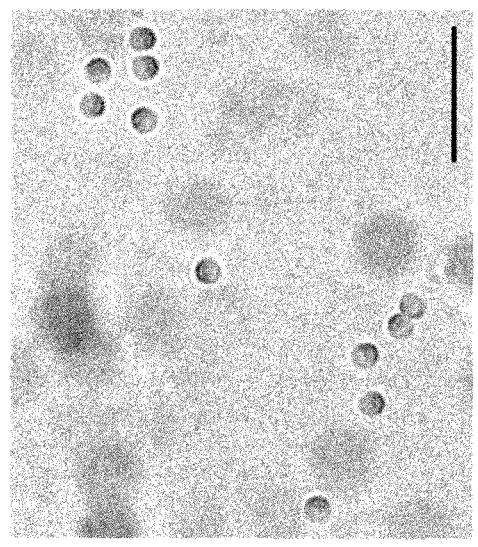
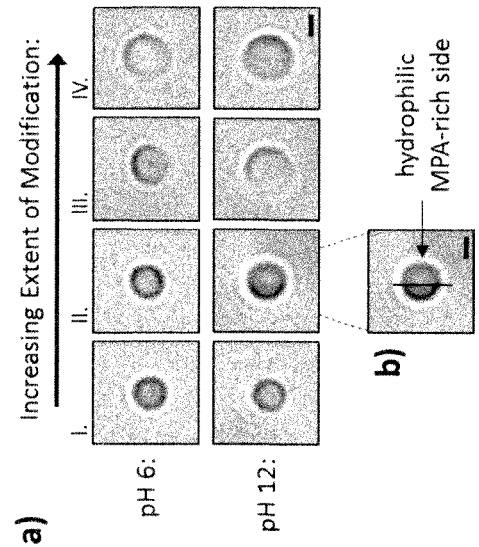
Figs. 12a-c

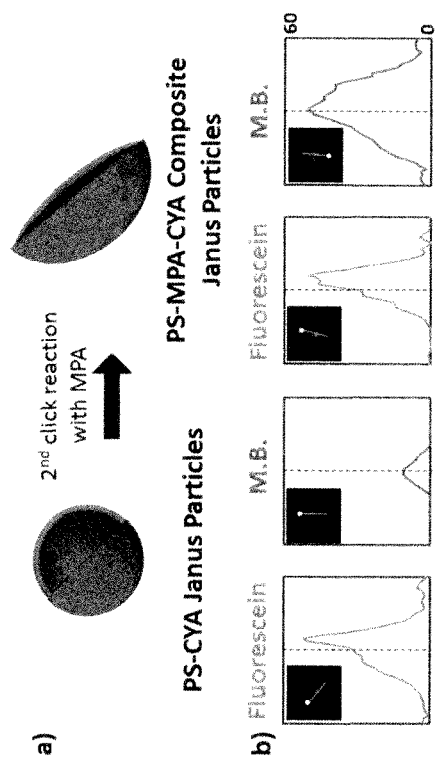
Figs. 13a-b

CLICK-ACTIVE JANUS PARTICLES AND METHODS FOR PRODUCING AND USING THE SAME

CROSS-REFERENCE TO RELATED APPLICATIONS

This application is the National Stage Application of International Patent Application No. PCT/US2017/035440, filed 1 Jun. 2017, which claims the benefit of U.S. Provisional Application No. 62/344,038, filed 1 Jun. 2016, the contents of which applications are incorporated herein by reference in their entireties for any and all purposes.

FIELD OF THE INVENTION

This invention relates to Janus particles and processes for producing such particles.

BACKGROUND OF THE INVENTION

Amphiphilic Janus particles are biphasic colloids that have two sides with distinct chemistry and wettability. Because of their amphiphilicity, Janus particles have particular utility with respect to stabilizing multiphasic fluid mixtures such as emulsions. Studies have shown that Janus particles offer advantages over their homogenous counterparts as solid surfactants. For example, the adsorption energy of a spherical Janus particle to an oil-water (OW) interface can be as large as three times that of its homogenous counterpart. Thus, Janus particles have a strong tendency to segregate to and remain at fluid interfaces.

Current methods for large scale synthesis of Janus particles do not allow for the fabrication of particles with diverse compositions.

SUMMARY OF THE INVENTION

Aspects of the invention relate to click-active Janus particles, methods for producing click-active Janus particles, as well as methods for functionalizing click-active Janus particles.

In accordance with one aspect, the invention provides for a method of producing click-active Janus particles. The method includes combining seed particles with a monomer emulsion to obtain monomer-swollen seed particles; and polymerizing the monomer-swollen seed particles to obtain click-active Janus particles.

In accordance with another aspect, the invention provides a click-active Janus particle obtained by the inventive method described above.

In yet another aspect, the invention provides a method for functionalizing click-active Janus particles. The method includes combining seed particles with a monomer emulsion to obtain monomer-swollen seed particles; polymerizing the monomer-swollen seed particles to obtain click-active Janus particles; and functionalizing the click-active Janus particles to form composite Janus particles using one or more click chemistry reactions.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 3a-e are schematic illustrations of a method for producing click-active Janus particles in accordance with aspects of the present invention;

FIG. 4a is a photograph of solutions of gold nanoparticles mixed with PS-PA and PS-CYA Janus particles at t=24 hours in accordance with aspects of the present invention;

FIG. 4b is an SEM image of gold nanoparticles adsorbed to the surface of the PS-CYA Janus particles in accordance with aspects of the present invention;

FIG. 4c is a magnified SEM image of gold nanoparticles adsorbed to the surface of the PS-CYA Janus particles in accordance with aspects of the present invention;

FIG. 9a is a Fourier Transform Infrared Spectroscopy analysis comparing the initial PS-PA clickable Janus particles to the partially functionalized PS-MPA and completely functionalized PS-MPA-MPE particles in accordance with aspects of the present invention;

FIG. 9b is a SEM image of the partially functionalized PS-MPA particles in accordance with aspects of the present invention;

FIG. 9c is a SEM image of the completely functionalized PS-MPA-MPE particles in accordance with aspects of the present invention;

FIG. 11a is a schematic illustration depicting the synthesis of PS-CYA-MPA particles through sequential click reactions with CYA followed by MPA in accordance with aspects of the present invention;

FIG. 11b is a collection of SEM images of the synthesis of PS-CYA-MPA particles through sequential click reactions with CYA followed by MPA in accordance with aspects of the present invention;

FIG. 11c is a collection of optical microscopy images show the swelling behavior of the PS-CYA and PS-CYA-MPA particles at neutral and high pH in accordance with aspects of the present invention;

FIG. 11d is a Fourier Transform Infrared Spectroscopy analysis of the synthesis of PS-CYA-MPA composite Janus particles in accordance with aspects of the present invention; in accordance with aspects of the present invention in accordance with aspects of the present invention in accordance with aspects of the present invention FIG. 12a is a microscopy image of PS-MPA particles with varying extents of modification at pH 6 and 12 in accordance with aspects of the present invention;

FIG. 12b is a microscopy image of a PS-MPA particle in which the solid line identifies boundary between two sides of particle formed under condition H in suspension at pH 12 in accordance with aspects of the present invention;

FIG. 12c is a microscopy image of PS-MPA particles from condition II at pH 12 exhibiting clear Janus boundaries in accordance with aspects of the present invention;

FIG. 13a is a schematic of PS-CYA Janus particles and PS-MPA-CYA composite Janus particles in accordance with aspects of the present invention; and FIG. 13b depicts fluorescence intensity profiles of fluorescein and methylene blue (M.B.) in accordance with aspects of the present invention.

Figure 1:
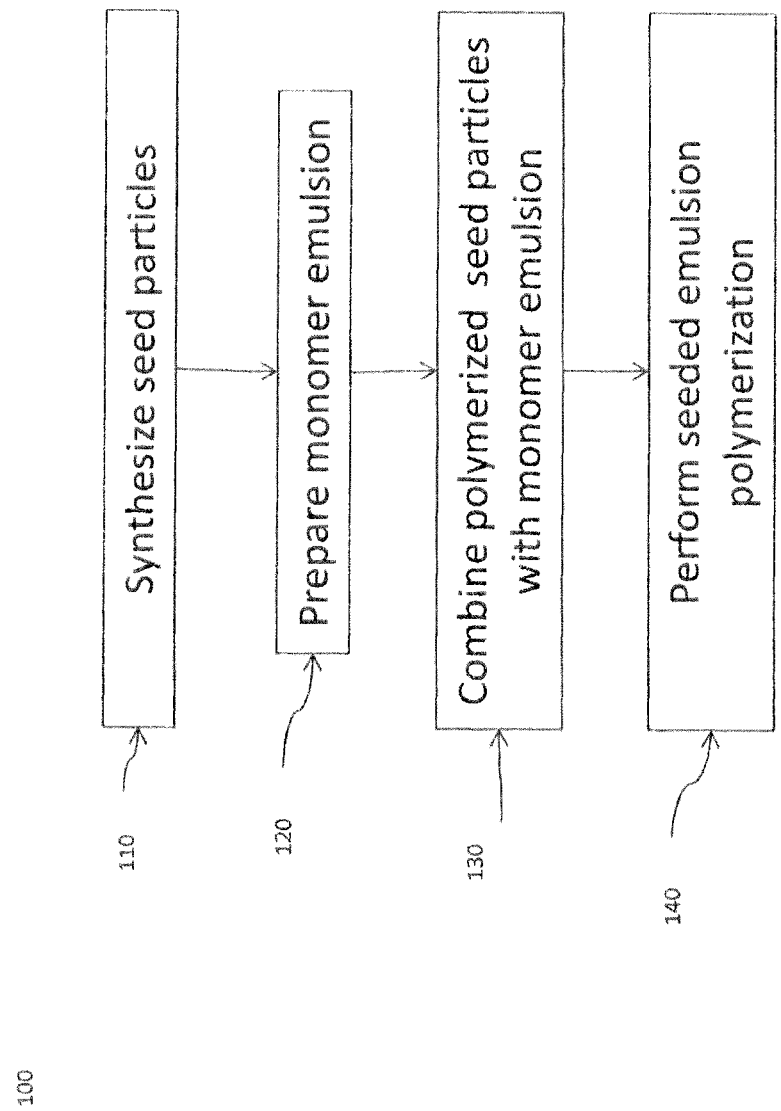
FIG. 1 is a flow diagram of a method for producing click-active Janus particles in accordance with aspects of the present invention.

Aspects of the invention are directed to click-active Janus particles, processes for preparing click-active Janus particles, and processes for functionalizing click-active Janus particles using click chemistry.

As used herein, "click-active" or "clickable" means that the particle or monomer so defined may participate in one or more "click chemistry" reactions. Click chemistry generally refers to a collection of reliable and self-directed organic reactions (Kolb H. C; Finn, M. G.; Sharpless, K. B. Angew. Chem. Int. Ed. 2001, 40, 2004-2021). Click chemistry reactions are in general: 1) modular; 2) wide in scope; 3) high yielding; 4) stereospecific; 5) physiologically stable; 6) thermodynamically driven to favor a single reaction product; and/or 7) simple in terms of reaction conditions, readily available starting materials and reagents, product isolation, and use of benign (or no) solvent.

Well-known click chemistry reactions include the azide-alkyne, alkyne-nitrone, thiol-isocyanate, Diels-alder, thiol-malemide, thiol-chloride, thiol-ene, as well as the thiol-yne suite of chemical reactions described in more detail below. One of ordinary skill in the art will understand that click-active Janus particles capable of functionalization through the above and other click chemistry reactions can, without departing from the scope of the invention described herein, be synthesized according to the methods described herein.

Amphiphilic particles according to aspects of the invention may be pH-responsive (i.e., they respond to changes in the pH of the solution in which they are dispersed) and may be used to stabilize different types of multiphasic mixtures such as emulsions (e.g., oil-in-water and water-in-oil). The amphiphilic particles are able to assemble into different structures depending upon the solution pH and change their aggregation/dispersion behavior. Depending upon the solution pH, the amphiphilic particles may be used to control the interactions between, e.g., oil-in-water emulsion droplets without inducing destabilization. In particular, emulsion droplets with attractive or repulsive interactions can be generated using the amphiphilic particles by changing the pH of the aqueous phase. The amphiphilic particles may also be used to induce a phase inversion of multiphasic mixtures in response to changes in the pH of the aqueous layer. Additionally, the amphiphilic particles are able to stabilize water-in-oil-in-water emulsions and, upon adjustment of the pH of the continuous aqueous phase, cause a release of the encapsulated water droplets.

It should be noted that the amphiphilic particles disclosed by the present invention need not be pH responsive. For example, while the PS-MPA particles described below are pH-responsive, other embodiments (including PS-CYA and PS-MPE particles) are not pH-responsive.

As used herein, an "amphiphilic particle" refers to a particle whose surface has two or more distinct types of chemistry, such as one-half of its surface composed of hydrophilic groups and the other half composed of hydrophobic groups (i.e., a Janus particle).

As used herein, a "multiphasic mixture" refers to any mixture of two or more immiscible or miscible fluids including, e.g., foams, gas mixtures, water-in-oil, oil-in-water, or water-in-oil-in-water emulsions.

As used herein, an "anisotropic particle" refers to a particle that is non-spherical in shape. Like amphiphilic particles, an anisotropic particle according to the present invention may be adapted to stabilize emulsions.

As used herein, "click-active monomer" refers to components that contain a click-active moiety (such as an alkyne pendant group) and can be copolymerized in a seeded emulsion polymerization. Preferably, the click-active moiety is not consumed during the emulsion polymerization step. Exemplary click-active monomers include propargyl acrylate vinylbenzyl chloride, 3-azidopropyl methacrylate, and glycidyl acrylate. Upon reading this disclosure, other click active monomers will become evident to those of ordinary skill in the art.

The Janus particles of the present invention can change the wetting properties of the solid surface. The inventive Janus particles can invert the wetting properties; for example, from hydrophilic to hydrophobic and vice versa. The inventive Janus particles can also enhance adhesion between two distinctly different surfaces. For example, it can enhance adhesion between hard and soft surfaces as well as between dry and wet (hydrated) surfaces. The inventive Janus particles can also enhance adhesion between planar and structured surfaces by filling in void spaces while also promoting adhesion between two difference surfaces.

In FIG. 1, a flow diagram depicting selected steps of a process 100 for producing click-active Janus particles according to aspects of the invention is shown. It should be noted that, with respect to the methods described herein, it will be understood from the description herein that one or more steps may be omitted and/or performed out of the described sequence of the method while still achieving the desired result.

In step 110, seed particles are synthesized. Generally, any hydrophobic polymer is suitable to use as a seed particle.

Suitable examples may be found among acrylics, esters, ethers, fluorocarbons, amides, imides, carbonates, dienes, olefins, styrenes, vinyl acetals, vinyls, vinylidene chlorides, vinyl esters, vinyl ethers, ketones vinylpyridine and vinypyrrolidone polymers.

Preferably, the seed particle is a linear polymer. In one embodiment, linear polystyrene is used as a seed particle.

Depending on the identity of the seed particle, one of ordinary skill in the art will understand that a variety of synthesis methods may be used. For example, dispersion polymerization may be used to synthesize linear polystyrene seed particles. Other synthesis methods include, without limitation, surfactant free emulsion polymerization, suspension polymerization, miniemulsion polymerization, microemulsion polymerization, macroemulsion polymerization, and precipitation polymerization. An additional synthesis method involves forming an oil-in-water emulsion using a linear polymer of hydrophobic component (e.g., polystyrene) in a volatile solvent such as toluene, and subsequently evaporating the solvent to form seed particles.

In step 120, a monomer emulsion is prepared. The monomer emulsion may desirably include a hydrophobic component and a click-active component that can eventually be converted, through additional functionalization, to a hydrophilic component. Hydrophobic components include methyl methacrylate, bromostyrene, and styrene. In one embodiment, the hydrophobic component is the same as the seed particle.

The monomer emulsion may further include an initiator for initiating polymerization. Exemplary polymerization initiators include 2,2'-Azobisisobutyronitrile (AIBN), benzoyl peroxide, and 2,2'-azobis(2,4-dimethylvaleronitrile).

In addition, where the production of amphiphilic (rather than anisotropic) particles is desired, a chemical cross-linking agent is included in the monomer emulsion. Examples of cross-linking agents include divinyl benzene (DVB), elemental sulfur, and bisacrylamide, but others will become apparent to persons of ordinary skill in the art. Preferably, the monomers used in the monomer emulsion and the cross-linker are miscible. It is believed that miscibility of the monomer emulsion and the cross-linker promotes homogeneity of the particles during bulk synthesis.

In an additional embodiment, a non-polymerizable solvent may be included. Suitable non-polymerizable solvents include, but are not limited to: toluene, hexane, benzene, and cyclohexane.

Where the production of anisotropic (rather than amphiphilic) particles is desired, the monomer emulsion of step 120 substitutes a non-polymerizable solvent, such as toluene, for the hydrophobic component and lacks a chemical cross-linker. It should be noted that the method embodiments that may produce amphiphilic Janus particles and the embodiments that may produce anisotropic particles differ only in the monomer emulsions prepared at step 120. The process 100 otherwise remains constant.

The seed particles obtained during step 110 and the monomer emulsion obtained during step 120 are combined in step 130. According to an embodiment, the seed particles absorb the monomer mixture over a period of time. Seed particle-monomer mixture combination step 130 may be carried out within a rotator set-up at 60 rpm for 24 hours.

Seeded emulsion polymerization is performed in step 140. The particles obtained from step 130 may be tumbled in an oil bath. In one embodiment, monomer-swollen particles are tumbled in an oil bath at 70° C. for approximately 24 hours. The result of step 140 is click-active Janus particles. If a non-polymerizable solvent (e.g., toluene) is used, it may be evaporated after polymerization.

Figure 2:
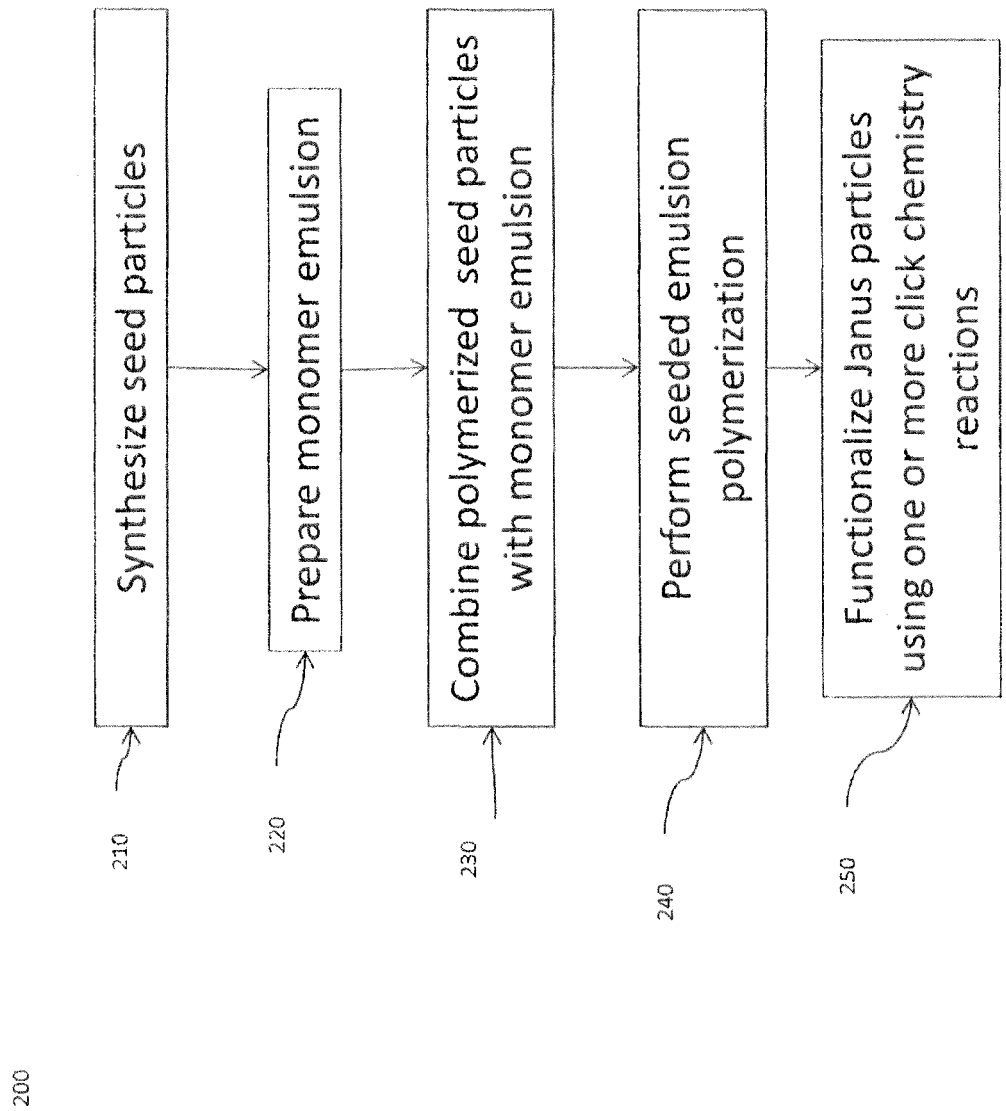
FIG. 2 is a flow diagram of a method for functionalizing click-active Janus particles in accordance with aspects of the present invention.

Turning to FIG. 2, a flow diagram depicting selected steps of a process 200 for functionalizing click-active Janus particles according to aspects of the invention is shown. Process 200 is essentially identical to process 100, except for the additional step 250 of functionalizing the resulting Janus particles using one or more click chemistry reactions.

In step 250, the Janus particles resulting from process 100 are functionalized using one or more click chemistry reactions. As described above, the click chemistry reactions may one or more of a thiol-yne reaction, an alkyne-azide reaction, or other click chemistry reactions known to one of ordinary skill in the art.

The one or more click chemistry reactions may involve the use of a photoinitiator such as, e.g., 1-[4-(2-Hydroxyethoxy)-phenyl]-2-hydroxy-2-methyl-1-propane-1-one, sold under the tradename Irgacure® 2959 (Ciba Specialty Chemicals, Newport, Del.). Other suitable photoinitiators include, without limitation, potassium persulfate, sodium anthraquinone-2,7-disulfonate, and hydrogen peroxide.

In certain embodiments, the one or more click chemistry reactions include at least two sequential click chemistry reactions. For example, and as described in further detail below synthesis of PS-CYA-MPA particles could be synthesized through two different and sequential click reactions, i.e., CYA followed by MPA.

In an alternative embodiment of the invention, click-active Janus particles are provided. The click-active Janus particles may be obtained from the inventive methods described herein.

EXAMPLES

The following examples are included to demonstrate the overall nature of the present invention. The examples further illustrate the improved results obtained by employing the amphiphilic particles and related processes.

Example 1—Synthesis of Seed Particles

Turning to FIGS. 3a-e, a schematic illustration for the synthesis of click-active Janus particles using seeded emulsion polymerization followed by functionalization through click chemistry is shown.

Linear polystyrene (LPS) seed particles were synthesized by dispersion polymerization. A solution of 0.03 g poly (vinyl pyridine) (MW≈55,000), 0.02 g ammonium persulfate (98%), 9 mL DI water (18.2 mΩ/cm), 6.6 ml styrene (≥99%), and 75 mL isopropyl alcohol (99.9%) was prepared in a 100 mL round bottom flask. The solution was purged with nitrogen for 5 minutes and then tumbled in an oil bath at 70° C. for 24 hours. After polymerization, the particles were washed thoroughly in DI water by centrifugation at 4500 rpm.

Example 2—Preparation of Click-Active Janus Particles

The click-active PS-PA Janus particles were synthesized via phase separation within seeded emulsion polymerization. A LPS dispersion was prepared by adding 0.2 g LPS particles to aqueous solution of 1 wt. % poly(vinyl alcohol) (PVA, Mw=13,000-23,000, 87-89% hydrolyzed). A monomer emulsion was prepared by mixing 0.004 g 2,2'-azobis (2,4-dimethylvaleronitrile) (V-65B, Wako), 3.2 mL of 1 wt. % PVA aqueous solution, and 0.8 mL monomer (3 mL styrene, 3 mL propargyl acrylate (PA, 98%), 60 μL divinylbenzene). The LPS dispersion and monomer emulsion were then vortexed for 60 seconds. The propargyl acrylate monomer was chosen because it contains click-active alkyne pendant groups which can be functionalized using readily available thiols, and is also easily copolymerized with styrene through the acrylate vinyl bond. The LPS dispersion was then added to the monomer emulsion. The emulsion solution was rotated at 60 rpm at room temperature for 24 hours and then transfer to an oil bath at 70° C. for 24 hours. After polymerization, the particles were washed thoroughly in DI water by centrifugation at 4500 rpm.

Example 3—Functionalization of Click-Active Janus Particles

The click-active PS-PA Janus particles were then functionalized through thiol-yne click-reactions in which thiol radicals react with the alkyne pendant groups. To demonstrate the versatility of our technique, the click-active PS-PA particles were functionalized to be amphiphilic by performing three thiol-yne click reactions with 2-mercaptopropionic acid (MPA), 2-mercaptoethanol (MPE), and cysteamine (CYA).

For the reactions with MPA and MPE (FIG. 3c), solutions were prepared by dispersing 3 mg PS-PA particles in 10 mL of thiol containing 1 wt. % 1-[4-(2-Hydroxyethoxy)-phenyl]-2-hydroxy-2-methyl-1-propane-1-one (Irgacure 2959) photoinitiator. For the reaction with CYA (FIG. 3e), 3 mg PS-PA particles was dispersed in 1M solution of CYA in methanol containing 1 wt. % Irgacure 2959. The solutions were placed in a glass petri dishes with stir bars rotating at 350 rpm and irradiated with UV light at 1 W/cm2 for 30 minutes. After the click reactions, the particles were washed in thoroughly in DI water by centrifugation at 4500 rpm.

The morphology of the particles was monitored throughout seed particle synthesis, production of click-active Janus particles, and functionalization. As shown in FIGS. 3a-e, the initial LPS particles are spherical and monodispersed while the click-active PS-PA particles are non-spherical likely due to phase separation between polystyrene and poly(propargyl acrylate). After the thiol-yne click reactions, a distinct boundary is observed between smooth and rough faces of the particles. Without intending to be bound by a particular theory, the inventors hypothesize that the smooth face of the particles is the hydrophilic side (MPA-rich, MPE-rich, or CYA-rich) whereas the rough face is the hydrophobic polystyrene-rich side in which dehydration of the particles results in non-uniform de-swelling.

Figure 10A:
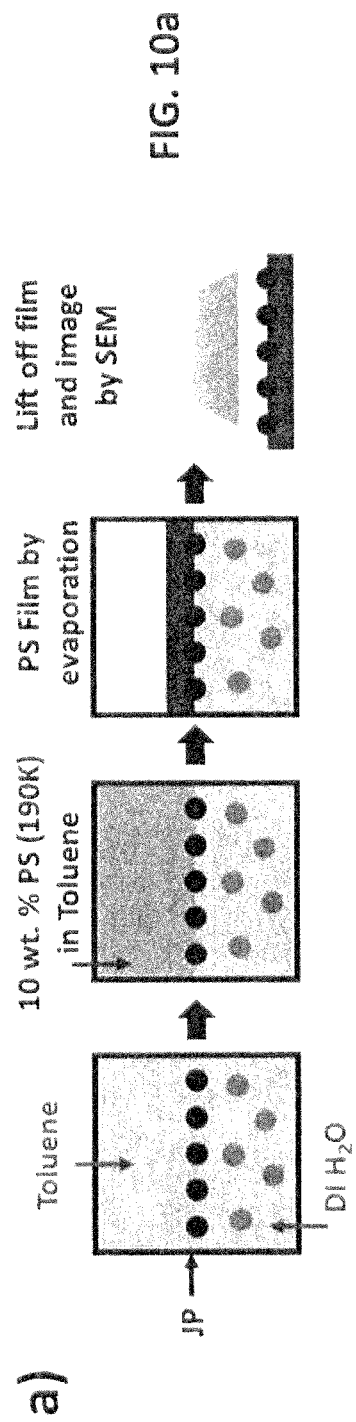
FIG. 10a is a schematic illustration depicting a process of embedding a monolayer of Janus particles at a toluene-water interface in a polystyrene film to identify which side is hydrophilic in accordance with aspects of the present invention.
Figure 10B:
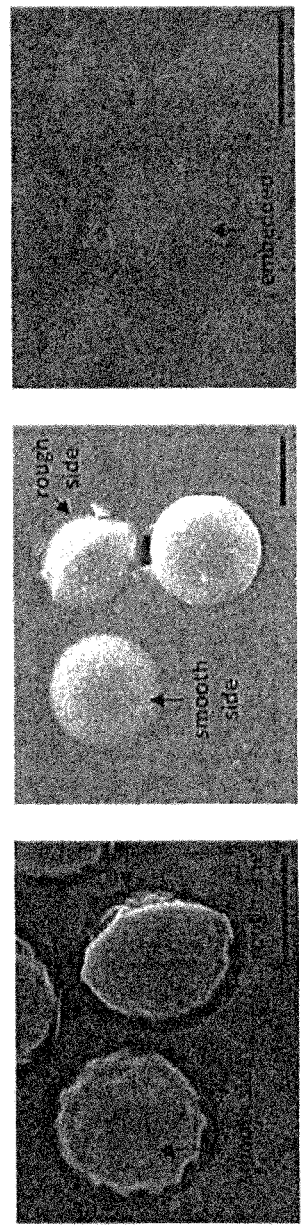
FIG. 10b is a collection of SEM images of PS-MPA, PS-MPE, and PS-CYA particles embedded in polystyrene film in accordance with aspects of the present invention.

The different faces of the Janus particles were identified by forming Gibbs monolayers at planar interfaces between aqueous particle suspensions and toluene. After 30 minutes, a solution containing 10 wt. % polystyrene (190,000 g/mol) in toluene was added and the toluene phase was allowed to evaporate to trap the particles at the interface in a polystyrene film. The films were then removed from the water surface and dried under vacuum overnight. SEM images of FIGS. 10a and b show that the smooth sides of the PS-MPA and PS-MPE particles are exposed and therefore are the hydrophilic sides of the particles because this side was oriented into the water phase. Without intending to be bound, it is similarly expected that the smooth face of the PS-CYA particles is also the hydrophilic side; however, the SEM images show that the particles became engulfed into the polystyrene film.

Figure 7:
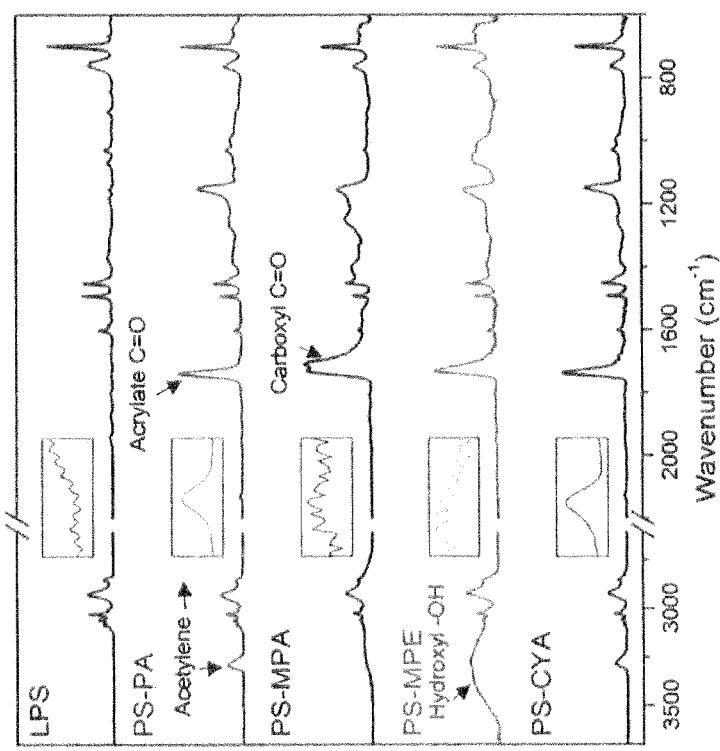
FIG. 7 is a Fourier Transform Infrared Spectroscopy analysis comparing the LPS seed particle and clickable PS-PA Janus particle to functionalized PS-MPA, PS-MPE, and PS-CYA Janus particles in accordance with aspects of the present invention.

As shown in FIG. 7, FTIR spectroscopy was used to measure the bulk composition and confirm successful functionalization of the Janus particles. The spectrum of the PS-PA Janus particles contains the characteristic peaks for the benzene ring (1540-1620 $cm^{-1}$) and $CH_2$ stretching (1420-1510 $cm^{-1}$) of PS as well as the characteristic acrylate carbonyl (1730 $cm^{-1}$) and click-active acetylene (2130 and 3270 $cm^{-1}$) of PA. The absence of a peak unique to PA around 1600 $cm^{-1}$ indicates that the copolymerization between PS and PA occurred through the acrylate vinyl bond.

Functionalization of the PS-PA clickable Janus particles with MPA and MPE was confirmed by detecting the presence of the carbonyl stretching (1710 $cm^{-1}$) for MPA and the hydroxyl stretching (2700-3600 $cm^{-1}$) for MPE. The spectra also show that functionalized was complete by the disappearance for the acetylene peak at 2130 $cm^{-1}$ (inserts). For the PS-CYA Janus particles, the spectrum was similar to the PS-PA Janus particles suggesting that the functionalization only occurred on the surface, which was also supported by the minimal morphology change of the particles. The complete functionalization with MPA and MPE is attributed to performing the click reactions in neat thiol; whereas CYA is solid at room temperature requiring the thiol-yne reaction to be performed in a 1M solution of CYA in methanol.

Figure 8:
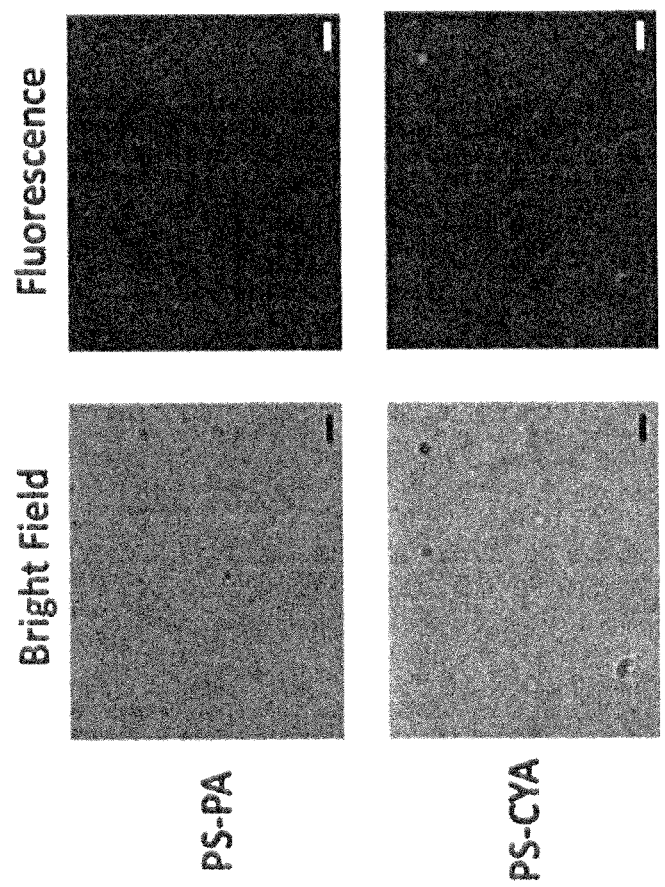
FIG. 8 is a collection of bright field and fluorescence microscopy images of PS-PA and PS-CYA particles reacted with Alexa Fluor 448 to detect presence of amine groups in accordance with aspects of the present invention.

As depicted in FIG. 8, the incorporation of the amine functionality was confirmed by observing fluorescence for PS-CYA particles labeled with an amine-reactive fluorescent probe. To identify the presence of amine groups on particles functionalized with CYA, PS-PA and PS-CYA particles were labeled with amine-reactive Alexa Fluor 488. The labeling was performed by adding 3 μL of 10 mM Alexa Fluor 488 in dimethyl sulfoxide to 200 μL solutions of particles (~0.1 mg/ml) in 10 mM 4-(2-hydroxyethyl)-1-piperazineethanesulfonic acid (HEPES) aqueous buffer. The solutions were left at room temperature for two hours before the particles were washed in DI water by centrifugation. The particle fluorescence was imaged using a 525 nm filter. PS-PA precursor particles showed no fluorescence, whereas the PS-CYA particles were fluorescent confirming presence of amine groups on the surface. Moreover, while the PS-PA particles were well dispersed in solution, the PS-CYA particles aggregated, likely due to anisotropic surface charge.

Further confirmation was shown by positive shift in the zeta potential from −43±1 mV for the precursor PS-PA Janus particles to −33±1 mV for the PS-CYA Janus particles:

TABLE 1

PARTICLE ZETA POTENTIALS
Particle Zeta Potential (mV)

| LPS | PS-PA | PS-MPA | PS-MPE | PS-CYA |
|---|---|---|---|---|
| −52 ± 1 | −43 ± 1 | −45 ± 2 | −46 ± 1 | −33 ± 1 |

The zeta potential of the particles dispersed in DI water was measured on a Beckman Coulter Delsa Nano C Particle Analyzer using the Smoluchowski model. The reported values in Table 1 are an average of three runs per sample. The zeta potential of the LPS seed particles is highly negative at −52 mV due to the presence of sulfonate groups from the initiator. The zeta potentials of the PS-PA, PS-MPE, and PS-MPA Janus particles were all shifted positive (ranging between −43 and −46 mV) compared to the LPS particles as a result of the dilution of the sulfonate groups at the surface of the particles. The PS-CYA particles have an even larger positive shift of the zeta potential to −33 mV further confirming the presence of positively charged amine groups.

Figure 5A:
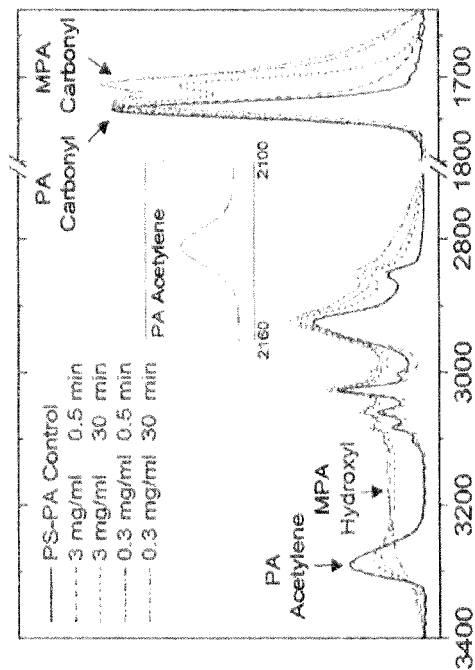
FIG. 5a is a Fourier Transform Infrared Spectroscopy analysis of PS-MPA particles functionalized through a thiol-yne click reactions at varying reaction times and the PS-PA particle concentrations in accordance with aspects of the present invention.
Figure 5B:
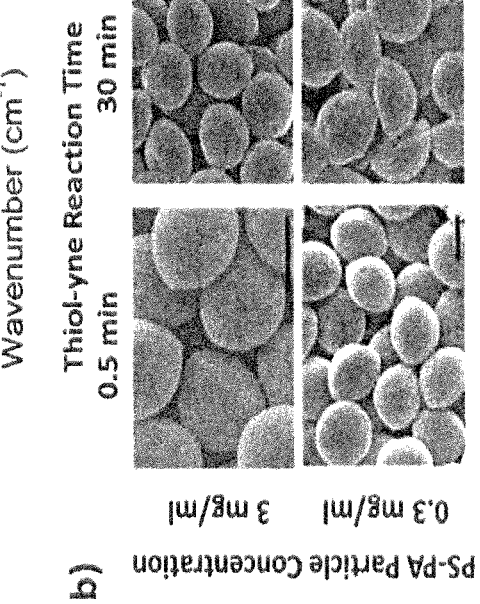
FIG. 5b is a collection of SEM images comparing the composition and morphology of PS-MPA particles made at varying reaction times and the PS-PA particle concentrations for the thiol-yne click reaction in accordance with aspects of the present invention.

Click chemistry not only allows the tailoring of chemical functionality and surface charge of Janus particles, but also enables the ability to control the extent of functionalization which the inventors have shown influences the particle shape and emulsion stability. The thiol-yne click reactions are UV initiated and can be quenched by turning off the UV lamp. Completely functionalized PS-MPA particles are synthesized by 30 minute reactions for 0.3 mg/ml PS-PA particles dispersed in neat MPA containing 1 wt. % photoinitiator. Decreasing the reaction time to 0.5 minutes, resulted in particles containing unreacted acetylene bonds. As depicted by FIG. 5a, the extent of functionalization could be further decreased by increasing the PS-PA particle concentration to 3 mg/ml for 30 and 0.5 minute reactions, respectively, as shown by continuous increase in the PA acetylene peaks and decrease in the MPA carbonyl peak in the FTIR spectra. It was also observed that the PA carbonyl shifted to lower wavenumber with increasing functionalization likely due to increasing resonance. Without intending to be bound by a particular theory, the inventors hypothesize that the functionalization of the particles occurs by a shrinking core mechanism in which the surface of the PS-PA particles is functionalized first and then swells delivering neat MPA to the interior of the particles. As depicted by FIG. 5b., and in agreement with this proposed mechanism, the morphology of the particles transforms from spherical to dome-shaped with increasing functionalization. The morphology change may be due to higher concentrations of hydrophilic MPA in the interior of the particles resulting in more deformation of the particles upon de-swelling when the particles are dried.

Additional data illustrates the ability to control particle size and swelling by varying the extent of modification with thiol-yne click reactions. Modification via a shrink-core mechanism is shown in Table 2 and FIGS. 12a-c by monitoring the size of PS-MPA particles at pH 6 and 12. Increasing the solution pH from 6 to 12, renders the carboxyl groups of MPA charged and therefore the MPA-modified regions swell in solution. The series of images shown in FIGS. 12a-c also illustrate the Janus character of the particles.

TABLE 2

SUMMARY OF REACTION CONDITIONS AND PARTICLE SIZE AT PH 6 AND 12 FOR PS-MPA PARTICLES WITH VARYING EXTENTS OF MODIFICATION

| Reaction Condition | Increasing Extent of Modification I to IV | | | |
| --- | --- | --- | --- | --- |
| | I | II | III | IV |
| Particle Concentration in Reaction Solution (mg/mL) | 3 | 3 | 0.3 | 0.3 |
| Reaction Time (min) | 0.5 | 30 | 0.5 | 30 |
| Particle Size at pH 6 (pixels) | 2318 ± 59 | 2536 ± 85 | 3056 ± 118 | 3554 ± 97 |
| Particle Size at pH 12 (pixels) | 2399 ± 101 | 3177 ± 152 | 3660 ± 205 | 4294 ± 188 |

FIG. 12a is a microscopy image of PS-MPA particles with varying extents of modification at pH 6 and 12 according to the present invention. FIG. 12b is a microscopy image of a PS-MPA particle in which the solid line identifies boundary between two sides of particle formed under condition II in suspension at pH 12 according to the present invention. FIG. 12c is a microscopy image of PS-MPA particles from condition II at pH 12 exhibiting clear Janus boundaries. The scale bars represent a,b) 1 µm and c) 10 µm.

Example 4—Functionalized Janus Particles as Surfactants for Phase-Selective Catalysis Janus particles loaded with negatively charged nanoparticles could be used as surfactants for phase-selective catalysis which has been shown to significantly increase reaction selectivity. To form nanoparticle-loaded Janus particles, amine functionalized PS-CYA Janus particles were combined with negatively charged gold nanoparticles (GNPs). Solutions of GNPs mixed with unmodified PS-PA and amine-functionalized PA-CYA Janus particles were both initially pink due to the dispersed GNPs. After 24 hours, as shown in FIG. 4a the GNP and PS-CYA solution lost the pink coloring suggesting that the GNPs are no longer dispersed, but adsorbed to the surface of the PS-CYA Janus particles. As shown in FIGS. 4b and c, SEM images show that the GNPs are indeed adsorbed to the surface of the PS-CYA particles. The self-assembly of negatively charged nanoparticles on Janus particles with local positive charge can provide a platform for making catalytic solid surfactants.

Example 5—Phase Inversion and Emulsion Stabilization

Figure 6:
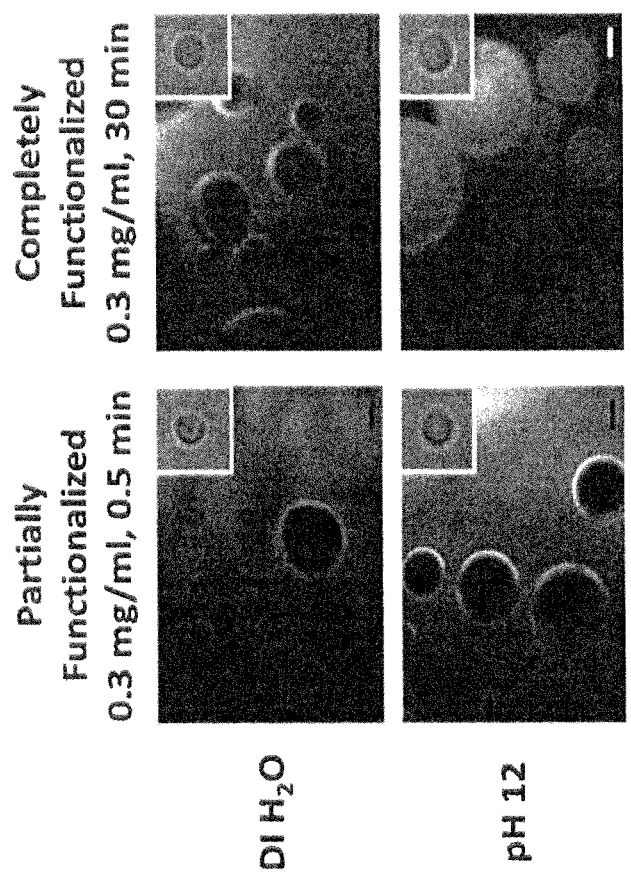
FIG. 6 is a collection of fluorescence microscope images of water and toluene emulsions stabilized by PS-MPA particles in accordance with aspects of the present invention.

As depicted in FIG. 6, the ability to tune the extent of functionalization of PS-MPA Janus particles allows the stabilization of either water-in-oil or oil-in-water emulsions. Janus particles containing pH-responsive carboxyl groups have been shown to form water-in-oil emulsions at neutral pH and oil-in water emulsions at high pH. The phase inversion of an emulsion can be induced because at high pH the carboxyl groups become highly hydrophilic leading to significant swelling which changes that packing of the particles and therefore the curvature of the interface. This emulsion inversion behavior has also been observed for completely functionalized PS-MPA particles; however, partially functionalized PS-MPA particles stabilize water-in-oil emulsions at both neutral and high pH. Optical microscopy images show that that completely functionalized particles have more extensive swelling resulting in the polystyrene-rich face (dark regions) occupying less of the particle surface (inserts). This demonstrates that regulating the extent of functionalization allows us to incorporate pH-responsive moieties while still maintaining control over the type of emulsions stabilized.

Example 6: Functionalization of Click-Active Janus Particles Using Sequential Click Reactions As discussed, the inventors posit that the performance of Janus particles depends on both the surface chemistry as well as the shape of the particles. However a singular functionalization may not achieve all the desired characteristics. This can be addressed by independently functionalizing the surface and the interior of Janus particles by performing sequential click reactions in which the first click reaction functionalizes the surface and second reaction functionalizes the interior. To demonstrate this, the interior of PS-CYA Janus particles was functionalized through a second click reaction with MPA to form PS-CYA-MPA composite Janus particles that contain both surface amine groups and pH-responsive shape-changing properties (FIG. 11a-d). The incorporation of MPA into the particles was confirmed by FTIR. The zeta potential in neutral DI water (−36±1 mV)

showed a similar positive shift as the PS-CYA (−33±1 mV) particles compared to the original PS-PA seed Janus particles (−43±1 mV) which confirms that the amine groups remain at the surface of the PS-CYA-MPA particles. SEM images show that the PS-CYA-MPA particles look strikingly similar to PS-MPA particles which is expected since we have previously established that the click reaction with CYA only occurred on the surface of the particles. Functionalizing the interior of the particles with MPA integrated shape-changing pH-responsiveness as shown by the increased swelling at high pH, whereas PS-CYA particles exhibit no such transition. To demonstrate the versatility of this synthesis, PS-MPA-MPE Janus particles were fabricated by reacting partially functionalized PS-MPA particles with MPE (FIG. 9a-c). The ability to synthesize functional Janus particles through sequential click reactions provides a simple method to optimize the interfacial activity or dictate self-assembly through the surface chemistry while also embedding stimuli-responsive or catalytic properties into the interior.

It has further been demonstrated that PS-CYA-MPA particles made using sequential reactions can be carriers for different cargo loaded onto the exterior and interior of the particles. The fabrication of PS-CYA-MPA particles using sequential reactions modified the particle surface with CYA and the particle interior with MPA. The PS-CYA-MPA can be subsequently used as carriers for oppositely charged cargo. This has been demonstrated in FIGS. 13a-b by loading fluorescein dye onto CYA on the particle surface and loading methylene blue dye onto MPA in the particle interior.

FIG. 13a is a schematic of PS-CYA Janus particles and PS-MPA-CYA composite Janus particles according to the present invention. FIG. 13b depicts fluorescence intensity profiles of fluorescein and methylene blue (M.B.) according to the present invention, Insets illustrate the lines scans (5 μm in length) overlaid on fluorescence images (10×10 μm2). The line scans are centered at the center of the particles identified from the bright field images, and the dots represent the starting position to indicate the direction of the scans.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for producing click-active Janus particles, comprising:
    combining seed particles with a monomer emulsion to obtain monomer-swollen seed particles, wherein the monomer emulsion comprises a mixture of at least one monofunctional hydrophobic monomer and at least one click-active monomer capable of additional functionalization, wherein the monofunctional hydrophobic monomer comprises at least one of methyl methacrylate, bromostyrene, and styrene; and
    polymerizing the at least one hydrophobic monomer of the monomer-swollen seed particles so as to obtain click-active Janus particles.

2. The method of claim 1, wherein the seed particles comprise a hydrophobic polymer.

3. The method of claim 2, wherein the hydrophobic polymer is linear polystyrene.

4. The method of claim 1, wherein the at least one hydrophobic monomer is the same chemical entity as the seed particle.

5. The method of claim 1, wherein the at least one click-active monomer is selected from the group consisting of propargyl acrylate, vinylbenzyl chloride, 3-azidopropyl methacrylate, and glycidyl acrylate.

6. The method of claim 1, wherein the monomer emulsion further comprises a cross-linking agent.

7. The method of claim 6, wherein the at least one cross-linking agent is selected from the group consisting of divinyl benzene, bisacrylamide, and elemental sulfur.

8. The method of claim 7, wherein the at least one cross-linking agent is divinyl benzene.

9. The method of claim 6, wherein the monomer emulsion further comprises a non-polymerizable solvent.

10. The method of claim 9, wherein the non-polymerizable solvent is selected from the group consisting of toluene, hexane, xylene, benzene, and cyclohexane.

11. The method of claim 8, wherein the hydrophobic monomer is styrene, the click-active monomer is propargyl acrylate, and the cross-linking agent is divinylbenzene.

12. A click-active Janus particle produced by the method of claim 1.

13. A method for functionalizing a click-active Janus particle, comprising:
    combining seed particles with a monomer emulsion to obtain monomer-swollen seed particles, wherein the monomer emulsion comprises a mixture of at least one hydrophobic monomer and at least one click-active monomer capable of additional functionalization;
    polymerizing the at least one hydrophobic monomer of the monomer-swollen seed particles so as to obtain click-active Janus particles and
    functionalizing the click-active Janus particles using one or more click chemistry reactions, wherein the one or more click chemistry reactions include one or more of a thiol-yne reaction and an alkyne-azide reaction.

14. The method of claim 13, wherein the seed particles comprise a hydrophobic polymer.

15. The method of claim 14, wherein the hydrophobic polymer is linear polystyrene.

16. The method of claim 13, wherein the at least one hydrophobic monomer is the same chemical entity as the seed particle.

17. The method of claim 13, wherein the at least one hydrophobic monomer is one or more of an acrylic, an ester, an ether, a fluorocarbon, an amide, an imide, a carbonate, a diene, an olefin, a styrene, a vinyl acetal, a vinyl, a vinylidene chloride, a vinyl ester, a vinyl ether, a ketone, a vinylpyridine polymer, and a vinypyrrolidone polymer.

18. The method of claim 13, wherein the at least one click-active monomer is selected from the group consisting of propargyl acrylate, vinylbenzyl chloride, 3-azidopropyl methacrylate, and glycidyl acrylate.

19. The method of claim 13, wherein the thiol-yne reaction involves one or more of 2-mercaptopropionic acid, 2-mercaptoethanol, and cysteamine.

20. A method for producing click-active Janus particles, comprising:
    combining seed particles with a monomer emulsion to obtain monomer-swollen seed particles, wherein the monomer emulsion comprises a mixture of at least one hydrophobic monomer and at least one click-active monomer capable of additional functionalization,
    wherein the monomer emulsion further comprises a cross-linking agent; and
    polymerizing the at least one hydrophobic monomer of the monomer-swollen seed particles so as to obtain click-active Janus particles.

21. The method of claim 1, wherein the click-active monomer and the monofunctional hydrophobic monomer are copolymerized.

22. A method for producing click-active Janus particles, comprising:
- combining seed particles with a monomer emulsion to obtain monomer-swollen seed particles, wherein the monomer emulsion comprises a mixture of at least one click-active monomer capable of additional functionalization and (i) at least one hydrophobic monomer and divinvyl benzene or (ii) and at least one hydrophobic monomer not including divinyl benzene; and
- polymerizing the at least one hydrophobic monomer of the monomer-swollen seed particles so as to obtain click-active Janus particles.

23. A method for functionalizing a click-active Janus particle, comprising:
- combining seed particles with a monomer emulsion to obtain monomer-swollen seed particles, wherein the monomer emulsion comprises a mixture of at least one hydrophobic monomer and at least one click-active monomer capable of additional functionalization;
- polymerizing the at least one hydrophobic monomer of the monomer-swollen seed particles so as to obtain click-active Janus particles and
- functionalizing the click-active Janus particles using one or more click chemistry reactions, wherein the one or more click chemistry reactions are conducted in the presence of a photoinitiator.

24. A method for functionalizing a click-active Janus particle, comprising:
- combining seed particles with a monomer emulsion to obtain monomer-swollen seed particles, wherein the monomer emulsion comprises a mixture of at least one hydrophobic monomer and at least one click-active monomer capable of additional functionalization;
- polymerizing the at least one hydrophobic monomer of the monomer-swollen seed particles so as to obtain click-active Janus particles and
- functionalizing the click-active Janus particles using one or more click chemistry reactions, wherein the one or more click chemistry reactions include at least two sequential click chemistry reactions.

25. The method of claim 24, wherein the at least two sequential click chemistry reactions are different.

* * * * *

UNITED STATES PATENT AND TRADEMARK OFFICE
CERTIFICATE OF CORRECTION

| | | |
|---|---|---|
| PATENT NO. | : 11,623,974 B2 | |
| APPLICATION NO. | : 16/305195 | |
| DATED | : April 11, 2023 | |
| INVENTOR(S) | : Daeyeon Lee et al. | |

It is certified that error appears in the above-identified patent and that said Letters Patent is hereby corrected as shown below:

On the Title Page

In Other Publications,
Under Column No. 2, Line no. 1, Replace:
"al.,Synthesis of"
With:
--al., Synthesis of--

In the Specification

Under Column No. 3, Line no. 30, Replace:
"H in"
With:
--II in--

Under Column No. 3, Lines no. 58-59, Replace:
"Diels-alder, thiolmalemide,"
With:
--Diels-alder, ethylmaleimide,--

Under Column No. 5, Line no. 3, Replace:
"olefins, styrenes,"
With:
--olefins, styrene,--

Under Column No. 5, Line no. 3, Replace:
"vinyls, vinylidene"
With:
--vinyl, vinylidene--

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,623,974 B2

Under Column No. 5, Lines no. 4-5, Replace:
"and vinypyrrolidone"
With:
--and vinylpyrrolidone--

Under Column No. 8, Line no. 13, Replace:
"cm$^-$) for"
With:
--cm$^{-1}$) for--

In the Claims

Under Column No. 12, Claim no. 17, Line no. 48, Replace:
"vinypyrrolidone polymer."
With:
--vinylpyrrolidone polymer.--

Under Column No. 13, Claim no. 22, Line no. 11, Replace:
"divinvyl benzene or"
With:
--divinylbenzene or--